(12) United States Patent
Shelestak

(10) Patent No.: US 8,664,132 B2
(45) Date of Patent: Mar. 4, 2014

(54) HIGH TRANSMITTANCE GLASS

(75) Inventor: Larry J. Shelestak, Bairdford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 48 days.

(21) Appl. No.: 13/222,075

(22) Filed: Aug. 31, 2011

(65) Prior Publication Data

US 2012/0058880 A1 Mar. 8, 2012

Related U.S. Application Data

(60) Provisional application No. 61/379,772, filed on Sep. 3, 2010.

(51) Int. Cl.
*C03C 3/087* (2006.01)

(52) U.S. Cl.
USPC .............................................. 501/70; 501/71

(58) Field of Classification Search
USPC .................................................... 501/70, 71
See application file for complete search history.

(56) References Cited

U.S. PATENT DOCUMENTS

| | | | |
|---|---|---|---|
| 1,615,448 A | 1/1927 | Frank | |
| 1,726,635 A | 9/1929 | Taylor | |
| 1,868,065 A | 7/1932 | Jaeckel | |
| 3,359,125 A | 12/1967 | Bishop | |
| 4,381,934 A | 5/1983 | Kunkle et al. | |
| 4,599,100 A | 7/1986 | Demarest, Jr. | |
| 4,634,461 A | 1/1987 | Demarest, Jr. et al. | |
| 4,792,536 A | 12/1988 | Pecoraro et al. | |
| 4,886,539 A | 12/1989 | Gerutti et al. | |
| 5,030,593 A | 7/1991 | Heithoff | |
| 5,030,594 A | 7/1991 | Heithoff | |
| 5,670,433 A * | 9/1997 | Amundson, Jr. ............... | 501/71 |
| 5,674,791 A * | 10/1997 | Amundson, Jr. ............... | 501/71 |
| 5,681,782 A * | 10/1997 | Amundson, Jr. ............... | 501/71 |
| 6,218,323 B1 | 4/2001 | Bretschneider et al. | |
| 6,407,021 B1 * | 6/2002 | Kitayama et al. ............... | 501/70 |
| 6,461,736 B1 | 10/2002 | Nagashima et al. | |
| 6,548,434 B2 | 4/2003 | Nagashima | |
| 6,610,622 B1 | 8/2003 | Landa et al. | |
| 6,612,133 B2 | 9/2003 | Sakaguchi et al. | |
| 6,831,030 B2 | 12/2004 | Koyama et al. | |
| 6,844,280 B2 | 1/2005 | Koyama et al. | |
| 6,878,653 B2 * | 4/2005 | Kitayama et al. ............... | 501/70 |
| 6,903,037 B2 | 6/2005 | Koyama et al. | |
| 6,949,484 B2 | 9/2005 | Landa et al. | |
| 6,962,887 B2 | 11/2005 | Heithoff | |
| 7,030,047 B2 | 4/2006 | Landa et al. | |
| 7,037,869 B2 | 5/2006 | Landa et al. | |
| 7,071,134 B2 | 7/2006 | Koyama et al. | |
| 7,087,307 B2 | 8/2006 | Nagashima et al. | |
| 7,144,837 B2 | 12/2006 | Landa et al. | |
| 7,169,722 B2 | 1/2007 | Landa et al. | |
| 7,326,665 B2 | 2/2008 | Akada et al. | |
| 7,435,696 B2 | 10/2008 | Scheffler-Hudlet et al. | |
| 7,482,294 B2 | 1/2009 | Landa et al. | |
| 7,482,295 B2 | 1/2009 | Landa et al. | |
| 7,557,053 B2 | 7/2009 | Thomsen et al. | |
| 7,560,402 B2 | 7/2009 | Thomsen et al. | |
| 7,560,403 B2 | 7/2009 | Landa et al. | |
| 7,562,538 B2 | 7/2009 | Landa et al. | |
| 7,601,660 B2 | 10/2009 | Tullman et al. | |
| 7,683,000 B2 | 3/2010 | Landa et al. | |
| 7,700,869 B2 | 4/2010 | Thomsen et al. | |
| 7,700,870 B2 | 4/2010 | Thomsen et al. | |
| 7,732,360 B2 | 6/2010 | Cid-Aguilar et al. | |
| 2003/0114291 A1 | 6/2003 | Koyama et al. | |
| 2006/0248923 A1 | 11/2006 | Krasnov et al. | |
| 2007/0155610 A1 * | 7/2007 | Maquin et al. ............... | 501/70 |
| 2007/0161492 A1 * | 7/2007 | Smith et al. ............... | 501/64 |
| 2007/0215205 A1 | 9/2007 | Thomsen et al. | |
| 2010/0122728 A1 * | 5/2010 | Fulton et al. ............... | 136/256 |
| 2010/0179044 A1 | 7/2010 | Sellier et al. | |
| 2010/0255980 A1 * | 10/2010 | Fulton et al. ............... | 501/65 |

FOREIGN PATENT DOCUMENTS

| | | |
|---|---|---|
| CN | 101462825 A | 6/2009 |
| JP | 2007-238398 | 9/2007 |
| WO | 2010/023419 A1 | 3/2010 |
| WO | 2010056432 A2 | 5/2010 |

OTHER PUBLICATIONS

Handbook of Glass Manufacture, F. V. Tooley, vol. 1, pp. 292-296, Ogden Publishing Co., New York, NY 1953.
PCT International Search Report, PCT/US2011/050160, dated Dec. 2, 2011.

* cited by examiner

*Primary Examiner* — Karl Group
*Assistant Examiner* — Elizabeth A Bolden
(74) *Attorney, Agent, or Firm* — Andrew C. Siminerio

(57) ABSTRACT

A high transmittance glass includes: $SiO_2$ in the range of 65 to 75 weight percent; $Na_2O$ in the range of 10 to 20 weight percent; CaO in the range of 5 to 15 weight percent; MgO in the range of 0 to 5 weight percent; $Al_2O_3$ in the range of 0 to 5 weight percent; $K_2O$ in the range of 0 to 5 weight percent; $MnO_2$ in the range of 0.035 to 0.6 weight percent; FeO in the range of 0.0010 to 0.0030 weight percent; and $Fe_2O_3$ (total iron) in the range of 0.001 to 0.03 weight percent. The glass has a redox ratio in the range of 0.1 to 0.4.

8 Claims, 4 Drawing Sheets

HIGH TRANSMITTANCE GLASS

CROSS-REFERENCE TO RELATED APPLICATIONS

This application claims priority to U.S. Provisional Application No. 61/379,772, filed Sep. 3, 2010, which is herein incorporated by reference in its entirety.

BACKGROUND OF THE INVENTION

1. Field of the Invention

This invention relates generally to glass with high infrared transmittance and high visible light transmittance and, more particularly, to a high transmittance float glass having low iron and low manganese content.

2. Technical Considerations

Solar cells (photovoltaic cells) and solar mirrors are used in the field of electricity generation. Solar cells convert solar energy to electrical energy. Solar cells typically have a high transmittance cover plate, such as a glass cover plate, through which the solar energy passes to reach the interior of the solar cell. Solar mirrors are used to reflect solar energy. Solar mirrors typically have a protective glass substrate. Solar energy passes through the substrate to a reflective coating, which reflects the solar energy back through the glass substrate to direct the solar energy to a designated area.

The glass used for solar cells and solar mirrors preferably has a high transmission in the electromagnetic spectrum above 380 nanometers ("nm"), e.g. transmission above 90% in the visible and the infrared ("IR") range. These articles also preferably have a low absorption, e.g. below 2%, in the visible and the IR ranges. The particular visible and IR range of the electromagnetic spectrum, and the peak transmission vary depending on the semi-conductor material of the photovoltaic cell. For example and not limiting to the discussion, for a silicon photovoltaic solar cell, the preferred visible and IR wavelength range is in the range of 380-1200 nm, and the peak transmission is at about 900 nm to 950 nm.

Generally, in the manufacture of float glass, glass batch materials are melted. The molten glass is fined and homogenized, and the fined homogenized molten glass is formed into a flat glass ribbon by controllably decreasing the temperature of the molten glass as it floats on a molten metal bath. Typical batch materials include sand, soda ash, limestone, dolomite, and salt cake. While soda ash and salt cake are naturally very low in iron content, the remaining materials, particularly sand, can have significant concentrations of iron unless they are chemically treated to remove the iron.

A problem with iron in glass is that, as a general rule, the higher the iron content (particularly FeO), the lower the light transmittance of the glass. For applications requiring high light transmission, special sand having naturally low iron content or sand that has been chemically treated to remove the iron, is used. However, this increases the expense of the resultant glass. Glass having a low total iron content expressed as $Fe_2O_3$, e.g. less than about 0.025% by weight (hereinafter also referred to as "wt %" or "wt. %"), is referred to conventionally as low iron glass. The iron is not added to the batch material intentionally but is present as an impurity in the ingredients of the batch material.

Even though the iron content is low in low iron glasses, for solar cells, it is desirable to reduce the weight percent of ferrous iron ($Fe^{+2}$) in the glass as much as possible to maximize the transmission, and minimize the absorption of the glass in the visible and IR range of the electromagnetic spectrum. Iron in the ferric state ($Fe^{+3}$) is a less powerful colorant than iron in the ferrous state and shifts the transmittance spectrum of the glass toward yellow and away from the usual green-blue effect of the ferrous iron in glass. Stated another way, increasing iron in the ferric state while decreasing iron in the ferrous state, increases the transmission, and decreases the absorption of the glass in the visible and the IR range.

One technique to reduce the weight percent of ferrous iron in the glass is to include an oxidizing agent in the glass batch materials. In the past, oxidizing agents such as $NaNO_3$, $CeO_2$, $Sb_2O_3$, and $As_2O_3$, have been added to the glass composition to reduce the amount of FeO. However, these previous oxidizing agents themselves have disadvantages that include processing, environmental and safety concerns. For example, $NaNO_3$ poses the problem of NOx emissions and $As_2O_3$ is poisonous. $Sb_2O_3$ and $As_2O_3$ are incompatible with the float glass process due to reactions in the tin bath that cause gray color streaks in the glass. Glass having $CeO_2$ has been found to "solarize" when exposed to sunlight for prolonged periods. By "solarize" or "solarization" is meant that exposing low iron glass having cerium oxide to sunlight causes the glass to change from a yellowish color to a bluish color due to the photo-oxidation of $Ce^{+3}$ to $Ce^{+4}$ and the photo-reduction of $Fe^{+3}$ to $Fe^{+2}$. Blue $Fe^{+2}$ absorbs more light than the yellow $Fe^{+3}$, which decreases the transmittance of the glass and reduces the electrical output of the solar cell.

As can now be appreciated, it would be advantageous to provide a low iron glass compatible with the float glass system that has low levels of iron in the ferrous state ($Fe^{+2}$) and does not have the solarization problem associated with prior glass.

SUMMARY OF THE INVENTION

A high transmittance glass comprises: $SiO_2$ in the range of 65 to 75 weight percent; $Na_2O$ in the range of 10 to 20 weight percent; CaO in the range of 5 to 15 weight percent; MgO in the range of 0 to 5 weight percent; $Al_2O_3$ in the range of 0 to 5 weight percent; $K_2O$ in the range of 0 to 5 weight percent; $MnO_2$ in the range of 0.035 to 0.6 weight percent; FeO in the range of 0.0010 to 0.0030 weight percent; and $Fe_2O_3$ (total iron) in the range of 0.001 to 0.03 weight percent. The glass has a redox ratio in the range of 0.1 to 0.4.

Another high transmittance glass comprises: $SiO_2$ in the range of 71 to 75 weight percent; $Na_2O$ in the range of 13 to 14 weight percent; CaO in the range of 10 to 11 weight percent; MgO in the range of 2 to 3 weight percent; $Al_2O_3$ in the range of 0.02 to 0.05 weight percent; $K_2O$ in the range of 0.01 to 0.02 weight percent; $MnO_2$ in the range of 0.18 to 0.25 weight percent; FeO in the range of 0.0015 to 0.0018 weight percent; and $Fe_2O_3$ (total iron) in the range of 0.007 to 0.008 weight percent. The glass has a redox ratio in the range of 0.15 to 0.25.

A method of making glass in a float glass process comprises adding glass batch materials to a glass melting furnace, the glass batch materials configured to provide glass comprising $SiO_2$ in the range of 65 to 75 weight percent; $Na_2O$ in the range of 10 to 20 weight percent; CaO in the range of 5 to 15 weight percent; MgO in the range of 0 to 5 weight percent; $Al_2O_3$ in the range of 0 to 5 weight percent; $K_2O$ in the range of 0 to 5 weight percent; $MnO_2$ in the range of 0.035 to 0.6 weight percent; FeO in the range of 0.0010 to 0.0030 weight percent; $Fe_2O_3$ (total iron) in the range of 0.001 to 0.03 weight percent; and a redox ratio in the range of 0.1 to 0.4. The glass batch materials are heated to form a glass melt. The glass melt is transferred onto a molten metal bath to form a glass ribbon.

DETAILED DESCRIPTION OF THE INVENTION

Figure 1:
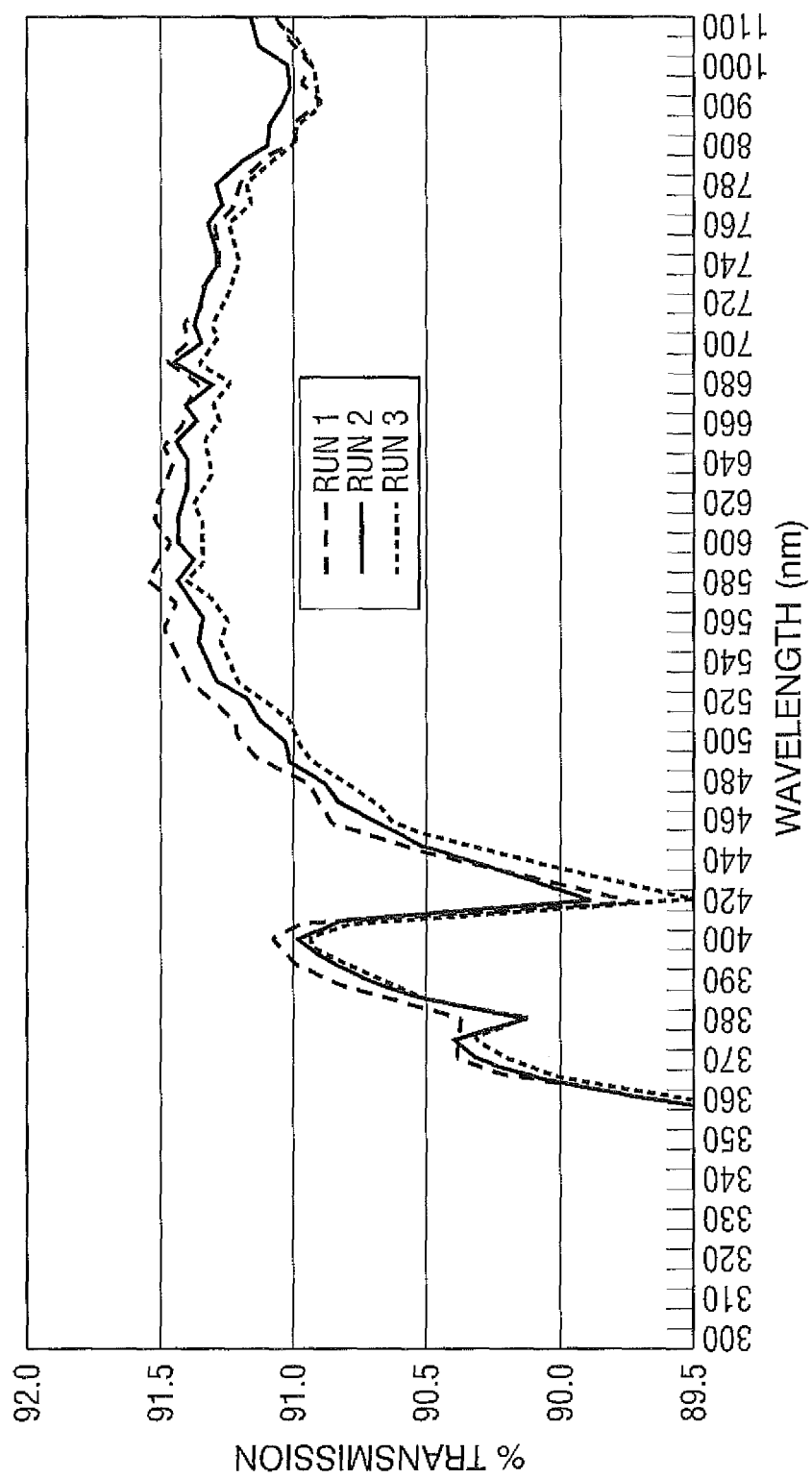
FIG. 1 is graph of wavelength (nm) versus percent transmittance for glass discussed in Example 2.

As used herein, spatial or directional terms, such as "inner", "outer", "left", "right", "up", "down", "horizontal", "vertical", and the like, relate to the invention as it is shown in the drawing figures. However, it is to be understood that the invention can assume various alternative orientations and, accordingly, such terms are not to be considered as limiting. Further, all numbers expressing dimensions, physical characteristics, and so forth, used in the specification and claims are to be understood as being modified in all instances by the term "about". Accordingly, unless indicated to the contrary, the numerical values set forth in the following specification and claims can vary depending upon the desired property desired and/or sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between and inclusive of the minimum value of 1 and the maximum value of 10; that is, all subranges beginning with a minimum value of 1 or more and ending with a maximum value of 10 or less, e.g., 1 to 6.7, or 3.2 to 8.1, or 5.5 to 10. Before discussing several non-limiting embodiments of the invention, it is understood that the invention is not limited in its application to the details of the particular non-limiting embodiments shown and discussed herein since the invention is capable of other embodiments. Further, all documents, such as but not limited to issued patents and published patent applications, previously discussed, or referred to, and to be discussed or referred to, herein below are to be considered to be "incorporated by reference" in their entirety. Still further, the terminology used herein to discuss the invention is for the purpose of description and is not of limitation. In addition, unless indicated otherwise, in the following discussion like numbers refer to like elements. Any reference to composition amounts, such as "by weight percent", "wt %" or "wt. %", "parts per million" and "ppm" are based on the total weight of the final glass composition, or the total weight of the mixed ingredients, e.g. but not limited to the glass batch materials, which ever the case may be. The "total iron" content of the glass compositions disclosed herein is expressed in terms of $Fe_2O_3$ in accordance with standard analytical practice, regardless of the form actually present. Likewise, the amount of iron in the ferrous state ($Fe^{+2}$) is reported as FeO, even though it may not actually be present in the glass as FeO. The proportion of the total iron in the ferrous state is used as a measure of the redox state of the glass and is expressed as the ratio $FeO/Fe_2O_3$, which is the weight percent of iron in the ferrous state (expressed as FeO) divided by the weight percent of total iron (expressed as $Fe_2O_3$). The visible range of the electromagnetic spectrum is 380-780 nanometers (hereinafter also referred to as "nm"), and the infra red (hereinafter also referred to as "IR") range of the electromagnetic spectrum is greater than 780 nm and usually considered to be in the range of 780-10,000 nm.

The present invention provides a soda-lime-silica glass that is high in visible light and infrared energy transmittance as measured in a normal (i.e. perpendicular) direction to a major surface of the glass sheet, and the glass of the invention is particularly ideal for, but is not limited to, use as cover plates for electric generating solar cells, and glass substrates for solar mirrors. By "high visible light transmittance" is meant measured visible light transmittance equal to or greater than 85%, such as equal to or greater than 87%, such as equal to or greater than 90%, at 4 mm glass thickness. As is appreciated by those skilled in the art, a glass having a 90% visible light transmittance at a thickness of 4 mm, has a visible light transmission greater than 90% at a thickness less than 4 mm and has a visible light transmission less than 90% at a thickness greater than 4 mm. By "high infrared energy transmittance" is meant measured infrared energy transmittance equal to or greater than 85%, such as equal to or greater than 87%, such as equal to or greater than 90%, such as equal to or greater than 91%, at 4 mm. As is appreciated by those skilled in the art, a glass having a 91% infrared energy transmittance at a thickness of 4 mm, has an infrared energy transmission greater than 91% at a thickness less than 4 mm and has an infrared visible light transmission less than 91% at a thickness greater than 4 mm for glasses having a thickness less than 4 mm.

The glass of the invention can be made using a conventional non-vacuum refiner float glass system or using a vacuum refiner float glass system. The system can utilize a conventional air fuel furnace or a conventional oxy-fuel furnace. In a float glass process, glass batch materials are introduced through an inlet opening into a furnace. Burners melt the batch materials and heat the molten glass. The burners can use either a mixture of air and fuel gas (air-fuel furnace), or a mixture of oxygen and fuel gas (oxy-fuel furnace), to generate the flames to heat the batch materials and the molten glass. The molten glass is delivered in any usual manner onto a pool of molten metal contained in a glass-forming chamber. As the delivered molten glass moves through the glass-forming chamber on the pool of molten metal, the molten glass is sized and cooled. A dimensionally stable sized glass ribbon moves out of the glass-forming chamber into an annealing lehr. Float glass making apparatus of the type described above are well known in the art and no further discussion is deemed necessary.

Although the invention is directed to low iron soda-lime-silica glasses, e.g. soda-lime-silica glasses having equal to or less than 0.025 wt. % (250 ppm), such as equal to or less than 0.01 wt. % (100 ppm) total iron expressed as $Fe_2O_3$, the invention is not limited thereto, and the invention can be practiced to lower the percent by weight of the ferrous iron in high iron glasses, e.g. soda-lime-silica glasses having greater than 0.01 wt. % (100 ppm) total iron expressed as $Fe_2O_3$. Further, the invention is not limited to glass cover plates for solar cells, and to glass substrates for solar mirrors, and can be used as a glass cover plate, or glass substrate for any type of solar cell or solar collector; as residential and commercial windows; as windows for any type of vehicle, e.g. land, air, space, above water, and below water, vehicle; and as furniture table tops, just to name a few examples.

The present invention provides a high transmittance glass that is less susceptible to solarization than previous cerium containing glass compositions and is compatible with a conventional float glass process. The glass of the present invention has a composition incorporating the following major components. By "major components" is meant materials intentionally added to provide the glass with a desired composition. Although the invention can be practiced with any type of conventional glass, the general principles of the invention will be described with respect to a conventional soda-lime-silica glass composition. An exemplary soda-lime-silica glass incorporating features of the invention is characterized as follows (all values are in weight percent unless specified otherwise):

TABLE 1

| $SiO_2$ | 65 to 75 |
| $Na_2O$ | 10 to 20 |
| CaO | 5 to 15 |
| MgO | 0 to 5 |
| $Al_2O_3$ | 0 to 5 |
| $K_2O$ | 0 to 5 |
| $MnO_2$ | 0.035 to 0.6 |
| FeO | 10 to 50 ppm |
| $Fe_2O_3$ (total iron) | 0.001 to 0.03 |

In the practice of the invention, the glass batch ingredients selected for making low iron glasses have no intentional addition of iron, and any iron present in the batch materials is present as tramp materials. Iron content generally referred to as tramp amounts of iron are amounts of iron less than 0.020 wt. %. For purposes of the present invention, batch materials are selected to have an iron content to provide the glass with a total iron expressed as $Fe_2O_3$ of less than 0.025 wt. % (250 ppm). In order to reduce the amount of iron, one or more low iron batch materials can be selected. For example, batch selection can include a low iron sand, which can have an iron content of about 0.008 wt. % iron (80 ppm) analyzed as $Fe_2O_3$. Limestone and dolomite, conventional glass batch materials, can be avoided because of their typical iron contamination. Instead, a purer source of calcium can be used, such as aragonite, which is a mineral form of calcium carbonate with only about 0.020 wt. % (200 ppm) $Fe_2O_3$. A low iron dolomite, having an iron ($Fe_2O_3$) content of less than about 0.020 wt. % (200 ppm), can be used. Aluminum hydrate can be used, with about 0.008 wt. % (80 ppm) $Fe_2O_3$.

As discussed above, in the practice of the invention, cerium is not added intentionally to the batch materials. If present, cerium is present as a tramp material, e.g. less than 0.010 wt. % (100 ppm). It should be appreciated that the glass compositions disclosed herein may include small amounts of other materials, for example, melting and refining aids, tramp materials, trace materials, impurities, and similar materials not intentionally added to change or affect the color of the glass. It should be further appreciated that small amounts of additional components may be included in the glass to provide desired color characteristics and/or improve the solar performance of the glass. For example, other tramp materials or impurities having a wt. % less than 0.01 wt. % that can be present can include $ZrO_2$, CoO, Se, NiO, Cl, $P_2O_5$, $V_2O_5$, $CeO_2$, $Cr_2O_3$, $Li_2O$, $K_2O$ and $TiO_2$.

With respect to the batch materials, $SiO_2$ is the principle component for the glass. $Na_2O$ and $K_2O$ impact the melting characteristics of the glass. MgO and CaO impact glass durability and affect the divitrification temperature and viscosity of the glass during molding. $Al_2O_3$ also influences glass durability. In accordance with the invention, $MnO_2$ is provided as an oxidizing agent to oxidize FeO to $Fe_2O_3$. With less FeO present, the transmittance of the glass is increased.

In a particularly advantageous non-limiting embodiment, the glass composition includes:

$SiO_2$ in the range of 70 to 75 weight percent, such as 71 to 75 weight percent, such as 72 to 74 weight percent;

$Na_2O$ in the range of 10 to 15 weight percent, such as 12 to 14 weight percent, such as 13 to 14 weight percent;

CaO in the range of 9 to 15 weight percent, such as 10 to 12 weight percent, such as 10 to 11 weight percent;

MgO in the range of 1 to 5 weight percent, such as 1 to 4 weight percent, such as 2 to 3 weight percent;

$Al_2O_3$ in the range of 0.001 to 0.1 weight percent, such as 0.005 to 0.09 weight percent, such as 0.02 to 0.05 weight percent;

$K_2O$ in the range of 0.001 to 0.1 weight percent, such as 0.005 to 0.05 weight percent, such as 0.01 to 0.03 weight percent, such as 0.01 to 0.02 weight percent;

$MnO_2$ less than or equal to 0.6 weight percent, such as less than or equal to 0.4 weight percent, such as less than or equal to 0.3 weight percent, such as less than or equal to 0.25 weight percent, such as less than or equal to 0.23 weight percent, such as less than or equal to 0.21 weight percent, such as less than or equal to 0.2 weight percent, such as less than or equal to 0.19 weight percent, such as less than or equal to 0.17 weight percent. For example, the $MnO_2$ can be in the range of 0.035 to 0.6 weight percent, such as 0.05 to 0.3 weight percent, such as 0.1 to 0.3 weight percent, such as 0.15 to 0.3 weight percent, such as 0.15 to 0.25 weight percent, such as 0.17 to 0.25 weight percent, such as 0.18 to 0.25 weight percent, such as 0.2 to 0.25 weight percent;

FeO in the range 10 to 30 ppm, such as 10 to 20 ppm, such as 15 to 18 ppm; and $Fe_2O_3$ (total iron) less than or equal to 0.025 weight percent, such as less than or equal to 0.02 weight percent, such as less than or equal to 0.015 weight percent, such as less than or equal to 0.01 weight percent, such as less than or equal to 0.008 weight percent, such as less than 0.007 weight percent. For example, the total iron can be in the range of 0.003 to 0.03 weight percent, such as 0.005 to 0.015 weight percent, such as 0.005 to 0.0125 weight percent, such as 0.005 to 0.01 weight percent, such as 0.005 to 0.008 weight percent, such as 0.007 to 0.008 weight percent.

The glass has a redox ratio greater than or equal to 0.1, such as greater than or equal to 0.15, such as greater than or equal to 0.19, such as greater than or equal to 0.2, such as greater than or equal to 0.22, such as greater than or equal to 0.25, such as greater than or equal to 0.3. For example, the redox ratio can be in the range of 0.1 to 0.4 such as 0.1 to 0.3, such as 0.15 to 0.3, such as 0.2 to 0.3, such as 0.2 to 0.25.

The glass of the invention is particularly useful for a glass substrate or glass cover plate for a photovoltaic silicon solar cell. Silicon cells typically have a maximum electrical conversion (radiant sensitivity) at about 950 nm. This wavelength is close to where $Fe^{+2}$ absorbs. Therefore, reducing the amount of $Fe^{+2}$ increases the glass transmission. It has been generally believed that the addition of $MnO_2$ to a low iron glass composition would lower the light transmission of the glass and be adverse to the use of the glass for solar cells. However, it has been surprisingly found that if the $Mn^{+3}$ is reduced to $Mn^{+2}$ by oxidation of $Fe^{+2}$ to $Fe^{+3}$ this does not adversely impact on the performance of the solar cell because the absorption peak of $Mn^{+2}$ is about 410 nm to 420 nm (see FIG. 1), which is near the lower wavelength limit for the solar response curve of polycrystalline silicon. The Mn in the glass composition interacts with the Fe via electron exchange. Therefore the higher light transmittance at longer wavelengths where the solar response of the silicon is greater offsets the decrease that may result from the lower light transmittance due to the absorption of $Mn^{+2}$. This results in more electricity generation by the solar cell module. In this system, $Mn^{+3}$ (purple) interacts with $Fe^{+2}$ (blue) to yield $Mn^{+2}$ (yellow) and $Fe^{+3}$ (yellow). Maintaining a redox ratio in the range of 0.1 to 0.4, such as greater than 0.2, promotes $Mn^{+2}$ and avoids $Mn^{+3}$.

The glass of the present invention can be made of any thickness, for example 1 mm to 20 mm, such as about 1 mm to 10 mm, such as 2 mm to 6 mm, such as 3 mm to 5 mm, such as 4 mm.

An exemplary glass composition of the invention is described in the following Examples; however, the invention is not limited to these specific Examples.

EXAMPLES

Example 1

A glass sheet having the following composition was made using a conventional float glass process. The following values are in weight percent.

TABLE 2

| | |
|---|---|
| $SiO_2$ | 72.43 |
| $Na_2O$ | 13.61 |
| CaO | 10.6 |
| MgO | 2.84 |
| $Al_2O_3$ | 0.04 |
| $K_2O$ | 0.014 |
| $MnO_2$ | 0.1899 |
| FeO | 0.0017 |
| $Fe_2O_3$ (total iron) | 0.0075 |

The glass had a redox ratio of 0.227.

A piece of the glass having a thickness of 3.2 mm was tested and had the following properties:

TABLE 3

| | |
|---|---|
| % Tuv | 87.31 |
| % Tvis | 91.32 |
| % Tir | 91.11 |
| % Tsol | 91.04 |
| % Tpv C—Si | 91.23 |

Tuv—ISO 9050, 2003, Air Mass 1.5 global, 300 to 380 nm
Tvis—Illuminant D65, 2°, 380 to 780 nm
Tir—ISO 9050, 2003, Air Mass 1.5 global, 780 to 2500 nm
Tsol—ISO 9050, 2003, Air Mass 1.5 global, 300 to 2500 nm
Tpv C—Si—ISO 9050, 2003, Air Mass 1.5 global, SolarWorld C—Si cell response (300 to 1200 nm).

Example 2

Several glasses of the invention were made using a commercial float glass process. The manganese oxide and iron values were varied. Several samples from each production run were analyzed and the results are shown in Table 4 below. In Table 4, the Tsol values are for 4 mm thickness and the total iron and manganese oxide values are in weight percent.

TABLE 4

| Run No. | Sample No. | $T_{SOL}$ | Redox | Total Iron | $MnO_2$ |
|---|---|---|---|---|---|
| 1 | 1 | 90.95 | 0.206 | 0.0073 | 0.189 |
| 1 | 2 | 90.97 | 0.227 | 0.0075 | 0.190 |
| 1 | 3 | 90.94 | 0.223 | 0.0073 | 0.195 |
| 2 | 4 | 90.90 | 0.238 | 0.0080 | 0.238 |
| 2 | 5 | 90.94 | 0.218 | 0.0078 | 0.243 |
| 2 | 6 | 90.88 | 0.218 | 0.0078 | 0.255 |
| 3 | 7 | 90.90 | 0.183 | 0.0071 | 0.262 |
| 3 | 8 | 90.91 | 0.171 | 0.0076 | 0.262 |
| 3 | 9 | 90.85 | 0.216 | 0.0074 | 0.263 |

FIG. 1 is a graph of percent transmittance versus wavelength (nm) for Sample 2 (Run 1), Sample 5 (Run 2), and Sample 8 (Run 3).

Figure 2:
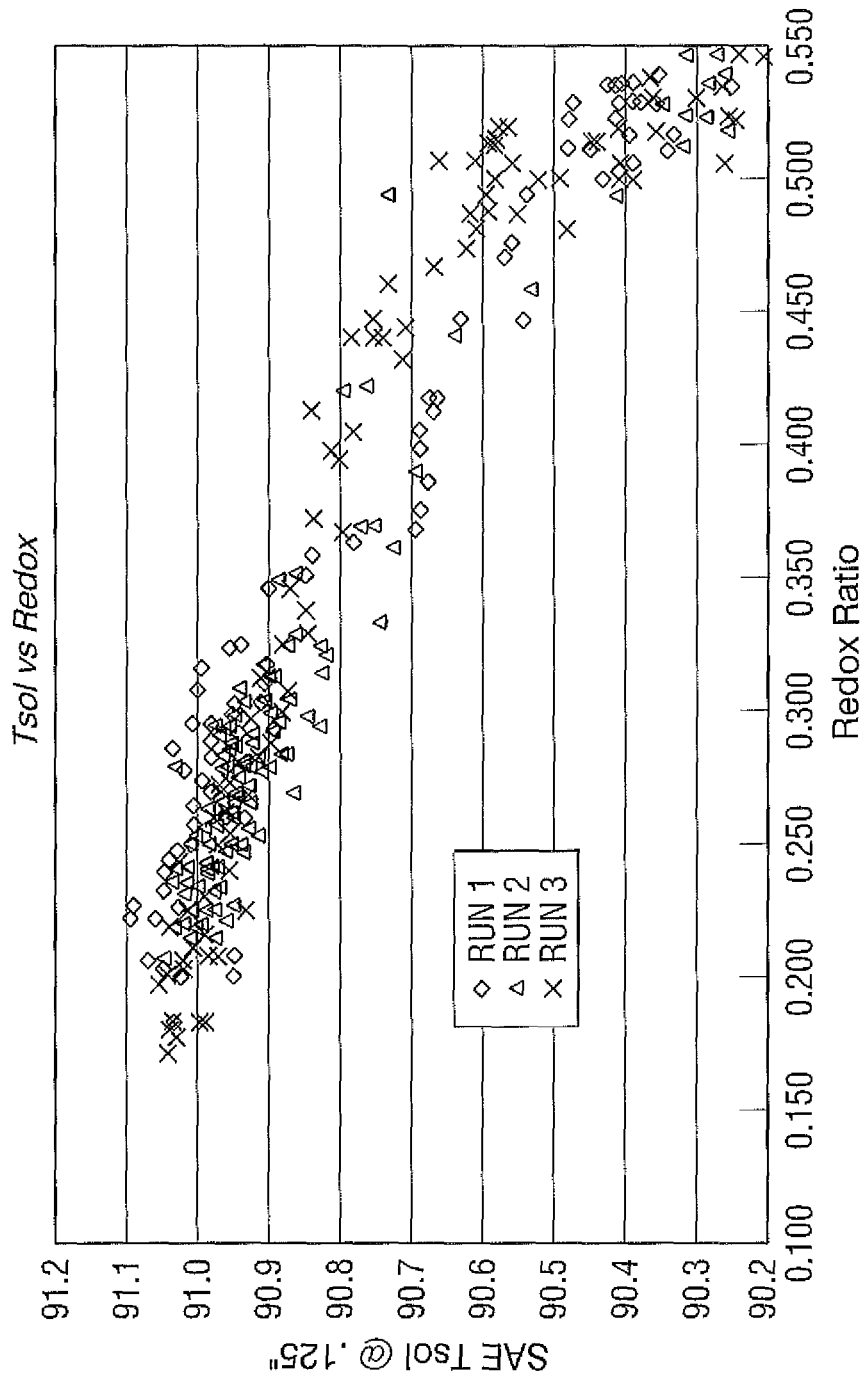
FIG. 2 is graph of redox ratio versus Tsol for Samples 2, 5, and 8 of Example 2.

FIG. 2 shows the redox ratio versus the Tsol (4 mm) for the Runs of Table 4. As the redox ratio lowers to about 0.25, the Tsol value starts to level off. As the redox ratio reaches and becomes lower than about 0.2, the Tsol values level off or begin to drop. This is believed to be due to the formation of $Mn^{+3}$ at the lower redox levels.

Figure 3:
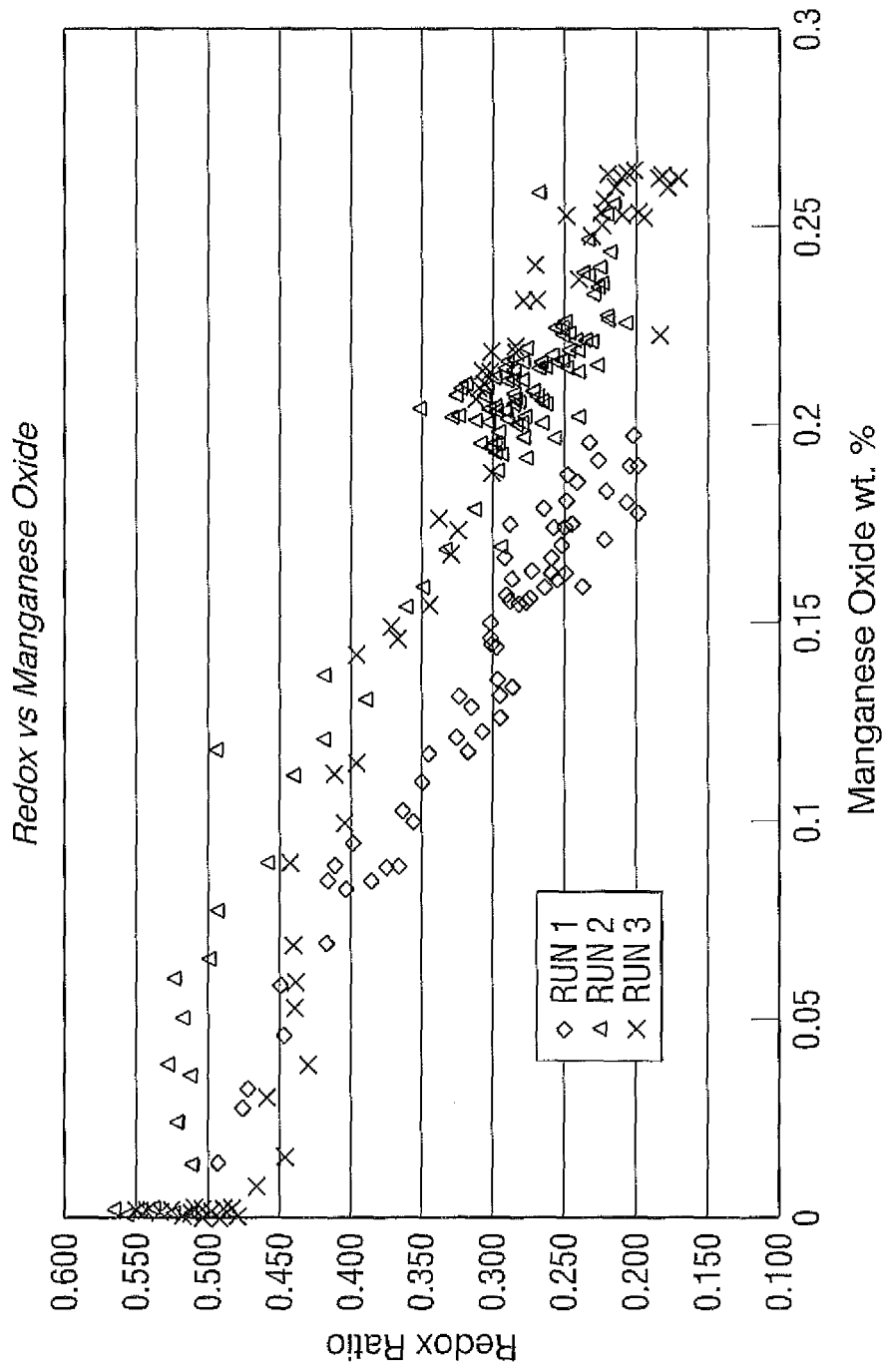
FIG. 3 is a graph of weight percent manganese oxide versus redox ratio for glass of Example 2.

FIG. 3 shows the weight percent of manganese oxide versus redox ratio for the Runs of Table 4. As manganese oxide increases, the redox ratio generally becomes lower.

Figure 4:
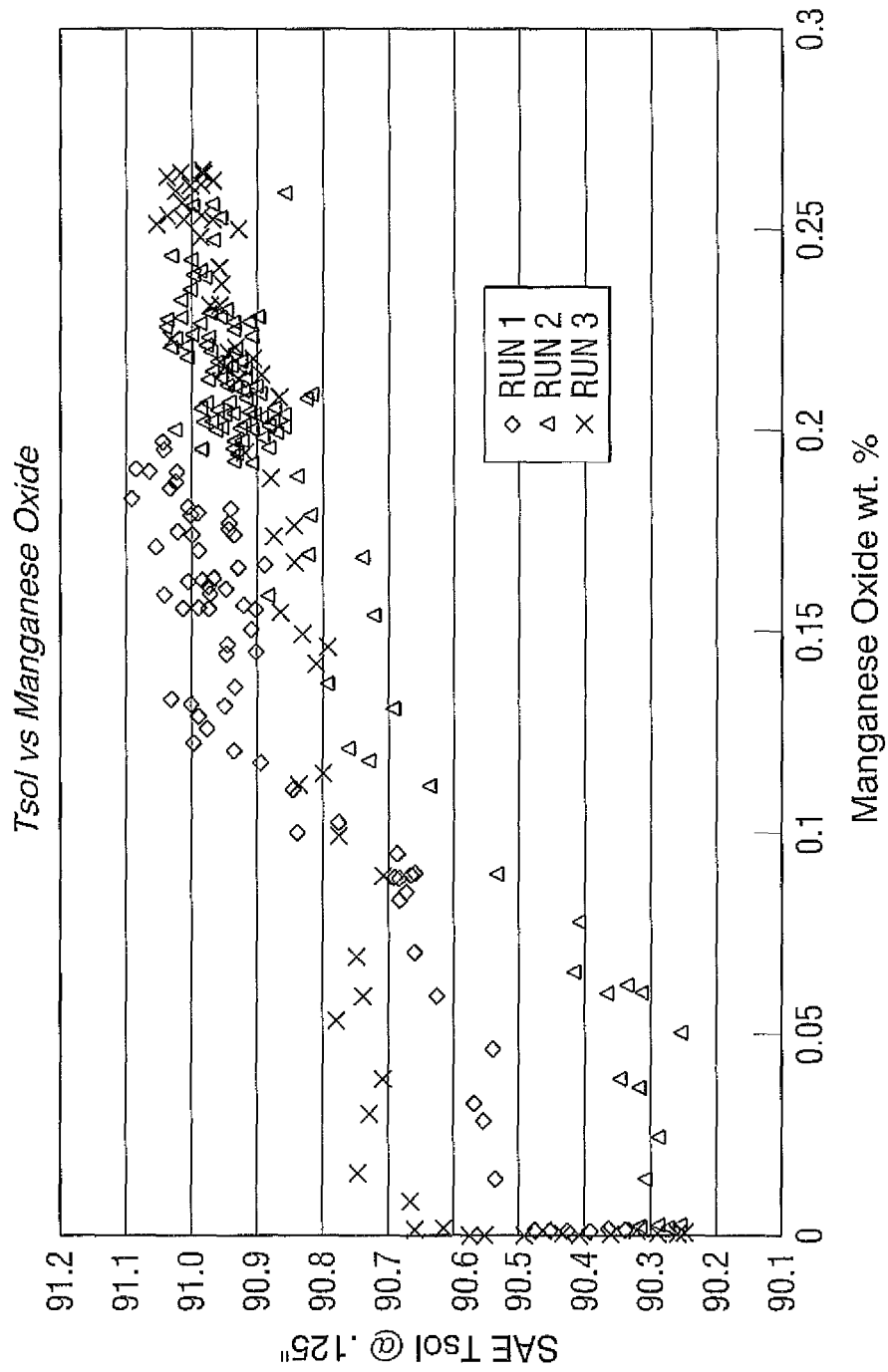
FIG. 4 is a graph of weight percent manganese oxide versus Tsol for glass of Example 2.

FIG. 4 shows the weight percent of manganese oxide versus Tsol over the range of 300 nm to 2500 nm for the Runs of Table 4. As the manganese oxide approaches 0.2 weight percent, the Tsol begins to level off. In the range of 0.2 to 0.25 weight percent manganese oxide, the Tsol value is substantially level. Above 0.25 weight percent manganese oxide, the Tsol value begins to decline. It also appears that the effect of manganese oxide on Tsol is minimal until the manganese oxide reaches about 0.05 weight percent.

It will be readily appreciated by one of ordinary skill in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A high transmittance glass, consisting essentially of:

| | |
|---|---|
| $SiO_2$ | 65 to 75 weight percent; |
| $Na_2O$ | 10 to 20 weight percent; |
| CaO | 5 to 15 weight percent; |
| MgO | 0 to 5 weight percent; |
| $Al_2O_3$ | 0 to 5 weight percent; |
| $K_2O$ | 0 to 5 weight percent; |
| $MnO_2$ | 0.1 to 0.6 weight percent; |
| FeO | 0.0010 to 0.0030 weight percent; |
| $Fe_2O_3$ (total iron) | 0.001 to 0.03 weight percent; | wherein the glass has a redox ratio in the range of 0.1 to 0.4.

2. The glass of claim 1, wherein the $MnO_2$ is in the range of 0.15 to 0.25 weight percent.

3. The glass of claim 1, wherein the $MnO_2$ is in the range of 0.2 to 0.25 weight percent.

4. The glass of claim 1, wherein the glass has a redox ratio in the range of 0.1 to 0.3.

5. The glass of claim 1, wherein the glass has a redox ratio in the range of 0.2 to 0.3.

6. The glass of claim 1, wherein the glass has a redox ratio in the range of 0.2 to 0.25.

7. The glass of claim 1, wherein the total iron is less than 0.02 weight percent.

8. A high transmittance glass, consisting essentially of:

| | |
|---|---|
| $SiO_2$ | 71 to 75 weight percent; |
| $Na_2O$ | 13 to 14 weight percent; |
| CaO | 10 to 11 weight percent; |
| MgO | 2 to 3 weight percent; |
| $Al_2O_3$ | 0.02 to 0.05 weight percent; |
| $K_2O$ | 0.01 to 0.02 weight percent; |
| $MnO_2$ | 0.18 to 0.25 weight percent; |
| FeO | 15 to 18 ppm; |

-continued

| | |
|---|---|
| Fe₂O₃ (total iron) | 0.007 to 0.008 weight percent; | wherein the glass has a redox ratio in the range of 0.15 to 0.25.

* * * * *